US006366912B1

(12) United States Patent
Wallent et al.

(10) Patent No.: US 6,366,912 B1
(45) Date of Patent: Apr. 2, 2002

(54) NETWORK SECURITY ZONES

(75) Inventors: Michael J. Wallent, Redmond; Rajeev Dujari, Kirkland; Anand Ramakrishna, Redmond; Loren M. Kohnfelder, Bellevue, all of WA (US); Lewis Geer, Bethesda, MD (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/055,772

(22) Filed: Apr. 6, 1998

(51) Int. Cl.⁷ .............................................. G06F 17/30
(52) U.S. Cl. ........................ 707/9; 707/513; 709/219; 713/200
(58) Field of Search ................................ 713/201, 200, 713/202; 707/9, 501, 513; 709/229, 217–21; 380/25, 24, 23

(56) References Cited

U.S. PATENT DOCUMENTS

| | | | |
|---|---|---|---|
| 5,678,041 A | * 10/1997 | Baker et al. ................... 707/9 |
| 5,684,951 A | * 11/1997 | Goldman et al. ........... 707/202 |
| 5,696,898 A | * 12/1997 | Baker et al. ................. 713/201 |
| 5,796,942 A | * 8/1998 | Esbensen ..................... 713/201 |
| 5,828,893 A | 10/1998 | Wied et al. |
| 5,835,726 A | 11/1998 | Shwed et al. |
| 5,919,247 A | 7/1999 | Van Hoff et al. |
| 5,930,792 A | * 7/1999 | Polcyn .......................... 707/9 |
| 5,940,843 A | * 8/1999 | Zucknovich et al. ....... 707/516 |
| 5,958,005 A | * 9/1999 | Thorne et al. .............. 709/202 |
| 5,958,051 A | * 9/1999 | Renaud et al. .............. 713/200 |
| 5,963,142 A | * 10/1999 | Zinsky et al. ................... 707/9 |
| 5,987,611 A | 11/1999 | Freund |
| 5,991,878 A | 11/1999 | McDonough et al. |
| 6,154,751 A | * 11/2000 | Ault et al. .................. 707/201 |

OTHER PUBLICATIONS

S.M. Bellovin et al., "Network Firewalls," *IEEE Communications Magazine*, Sep. 1994, pp. 50–57.

* cited by examiner

*Primary Examiner*—Hosain T. Alam
*Assistant Examiner*—Jean Bolte Fleurantin
(74) *Attorney, Agent, or Firm*—Christensen O'Connor Johnson Kindness PLLC

(57) ABSTRACT

A computer based system and method of providing security when receiving digital data at a client computer from one or more Web sites is disclosed. The method includes receiving security configuration information that specifies multiple security zones, each zone corresponding to a set of Web sites. The security configuration information also includes information specifying a set of security settings corresponding to each security zone. A security setting is a specification indicating an action to perform when a Web page from one of the security zones requests a protected operation to be performed. During a Web browsing session, the mechanism of the invention determines the security zone corresponding to the Web site currently being browsed. Prior to performing the protected operation, the mechanism of the invention determines the action to perform, based on the current Web site's security zone, the requested operation, and the security setting corresponding to the requested operation and the Web site's zone. Depending upon the security setting, the Web browser may perform the requested operation, prevent the requested operation from being performed, or prompt the user of whether to perform the requested operation. During the browsing of a Web site, the Web browser visually indicates the security zone corresponding to the current Web site.

19 Claims, 9 Drawing Sheets

NETWORK SECURITY ZONES

FIELD OF THE INVENTION

The present invention relates to the field of network browsing software and, in particular, to methods and systems for providing security when accessing network sites.

BACKGROUND OF THE INVENTION

In recent years, there has been a tremendous proliferation of computers connected to a global network known as the Internet. A "client" computer connected to the Internet can download digital information from "server" computers connected to the Internet. Client application and operating system software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents. A Web site may use one or more Web server computers that are able to store and distribute documents in one of a number of formats including the Hyper Text Markup Language (HTML). An HTML document can contain text, graphics, audio clips, and video clips, as well as metadata or commands providing formatting information. HTML documents also include embedded "links" that reference other data or documents located on the local computer or network server computers.

A Web browser is a client application, software component, or operating system utility that communicates with server computers via FTP, HTTP, and Gopher protocols. Web browsers receive Web documents from the network and present them to a user. Internet Explorer, available from Microsoft Corporation, of Redmond, Washington, is an example of a popular Web browser.

An intranet is a local area network containing Web servers and client computers operating in a manner similar to the World Wide Web described above. Additionally, on an intranet a Web browser can retrieve files from a file system server executing on the same computer as the Web browser, or on a remote computer on the local area network. A Web browser can retrieve files on the local area network using the "FILE" protocol, which comprises file system commands. Typically, all of the computers on an intranet are contained within a company or organization. Many intranets include a "firewall" that functions as a gateway between the intranet and the Internet, and prevents outside people from breaking into the computers of an organization. A "proxy server" is one well-known type of firewall.

In addition to data and metadata, HTML documents can contain embedded software components containing program code that perform a wide variety of operations. These software components expand the interactive ability of an HTML document's user interface. The components can perform other operations, such as manipulating data and playing audio or video clips. ActiveX is a specification developed by Microsoft Corporation for creating software components that can be embedded into an HTML document. Java is a well-known programming language that can be used to develop components called "applets," which are transmitted with HTML documents from Web servers to client computers. JavaScript and VBScript are scripting languages that are also used to extend the capabilities of HTML. JavaScript and VBScript scripts are embedded in HTML documents. A browser executes each script as it reaches the position in the script during interpretation of the HTML document.

Some software components transferred over the World Wide Web perform operations that are not desired by a user. This may occur either because a component developer intentionally programmed the component to perform a malicious operation, or because a "bug" in the software causes the component to perform a malicious operation. In addition to components that are transferred with an HTML document, files transferred to a client computer utilizing other protocols, such as FTP, may include commands that perform malicious operations.

One way in which browsers have addressed the problem of undesirable operations being performed as a result of Web transfers is to notify the user prior to performing a "risky" operation. The user is permitted to determine, prior to each operation, whether to allow the specified operation. For example, prior to installing an ActiveX control, a browser may display a dialog window specifying the source of the ActiveX control and allowing the user to decide whether or not to install the specified control. Similarly, the browser may present a dialog window to the user prior to downloading a file, executing a program, or executing a script.

This security procedure can result in a user repeatedly being presented with dialog windows asking for permission to perform certain operations, interrupting the user's browsing session. Faced with frequent interruptions, a user may respond hastily and improperly.

It is desirable to have a mechanism that allows a user to specify desired security information in order to avoid repetitive and unnecessary queries from the Web browser. Preferably, such a mechanism will provide a browser user with a way to categorize different Web servers according to a level of trust, and allow the performance of operations based on the level of trust corresponding to a source location. Additionally, a preferable mechanism will allow an administrator or an end user to specify, for each category of source locations, a corresponding set of operations that are allowed or disallowed. Further, a preferable mechanism will provide sets of predetermined security settings that can be associated with each category of trust level. The present invention is directed to providing such a mechanism.

SUMMARY OF THE INVENTION

In accordance with this invention, a system and a computer based method of providing security when browsing one or more Web sites from a client computer is disclosed. The method includes configuring a Web browser to establish multiple security zones, each zone corresponding to a set of Web sites. Each zone has a corresponding set of security settings that specify actions to be taken when a corresponding protected operation to be performed in response to receiving a Web document. During a Web browsing session, the mechanism of the invention determines the security zone corresponding to the Web site currently being browsed. Prior to performing a protected operation, the mechanism of the invention determines the action to perform, based on the current Web site's security zone, the requested operation, and the security setting corresponding to the requested operation and the Web site's zone.

In accordance with other aspects of this invention, during a Web browsing session between a client computer and a server computer, upon receiving, at the client computer, a Web document from a server computer, the Web browser determines whether a protected operation is to be performed in response to receiving the Web document. If a protected operation is to be performed, the Web browser determines a security setting corresponding to the protected operation and the server computer. The Web browser may perform the protected operation or prevent the performance of the protected operation. It may also query a user whether to perform the protected operation and selectively perform the protected operation based on the user response.

In accordance with still other aspects of this invention, the Web browser displays visual information indicating the security zone corresponding to a server computer when a Web document from the server computer is being displayed.

In accordance with yet still other aspects of this invention, the client computer may be located behind a firewall, and receive Web documents from server computers behind the firewall and remote server computers external to, or outside of, the firewall. The Web browser may be configured so that one security zone does not include any server computers that are external to the firewall and so that another security zone includes only server computers that are behind the firewall. Preferably, the browser is configured so that the security zone corresponding to the server computers external to the firewall specifies a higher level of security than the security zone corresponding to server computers behind the firewall.

As will be readily appreciated from the foregoing description, a system and method of providing security when browsing Web sites formed in accordance with the invention provides a way of selectively restricting operations that can be performed during a Web browsing session, such that the restrictions may vary according to the level of trust that a user has for each Web site. The invention allows the user to configure a Web browser so that the different security zones reflect different levels of trust for each corresponding group of Web sites. Default security settings corresponding to each security zone and a default distribution of Web sites among the security zones simplifies the process of configuring a Web browser. Allowing a user to modify the default settings provides users with customizable security to allow for differing situations or concerns. The invention minimizes the amount of disruption that may occur during a Web browsing session in order to determine the user's preferences. By allowing a user to configure the security settings at a time convenient to the user, the invention increases the likelihood that the user will carefully consider the choices involved in security configurations.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a mechanism for providing security when receiving digital data at a client computer from one or more Web sites. A Web site is a source of digital data and may correspond to one or more server computers, or to a subset of the data stored at a server computer. A server computer may include multiple Web sites. For example, the data contained within a directory structure stored on a computer may correspond to a Web site. A Web site may be identified by a specification of an Internet domain, an Internet protocol (IP) address, or a directory path. The process of locating and receiving digital data from Web sites is referred to as "browsing." The mechanism of the invention configures a "Web browser" to specify a plurality of zones. Each zone includes one or more Web sites, each Web site being situated on a corresponding computer network. The configuration includes information specifying a set of security settings corresponding to each zone. A security setting is a specification indicating an action to perform when a Web page from one of the zones requests a protected operation to be performed. During a Web browsing session, the mechanism of the invention determines the zone corresponding to the Web site currently being browsed. Prior to performing the protected operation, the mechanism of the invention determines the action to perform, based on the current Web site's zone, the requested operation, and the security setting corresponding to the requested operation and the Web site's zone. Depending upon the security setting, the Web browser may perform the requested operation, prevent the requested operation from being performed, or prompt the user for a decision as to whether to perform the requested operation. During the browsing of a Web site, the browser visually indicates the zone corresponding to the Web site.

Figure 1:
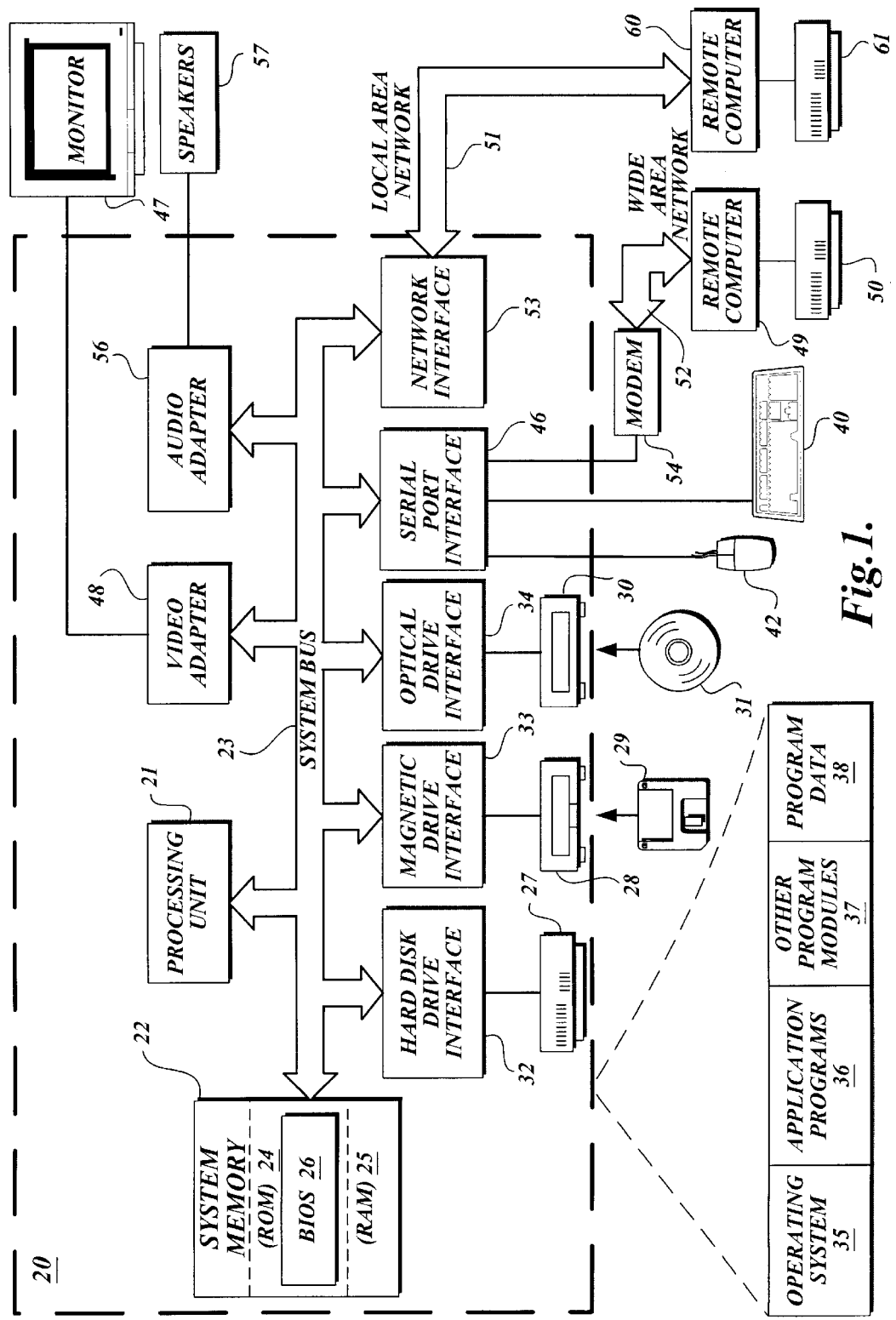
FIG. 1 is a block diagram of a general purpose computer system for implementing the present invention.

In accordance with the present invention, a Web browser executes on a computer, such as a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 farther includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
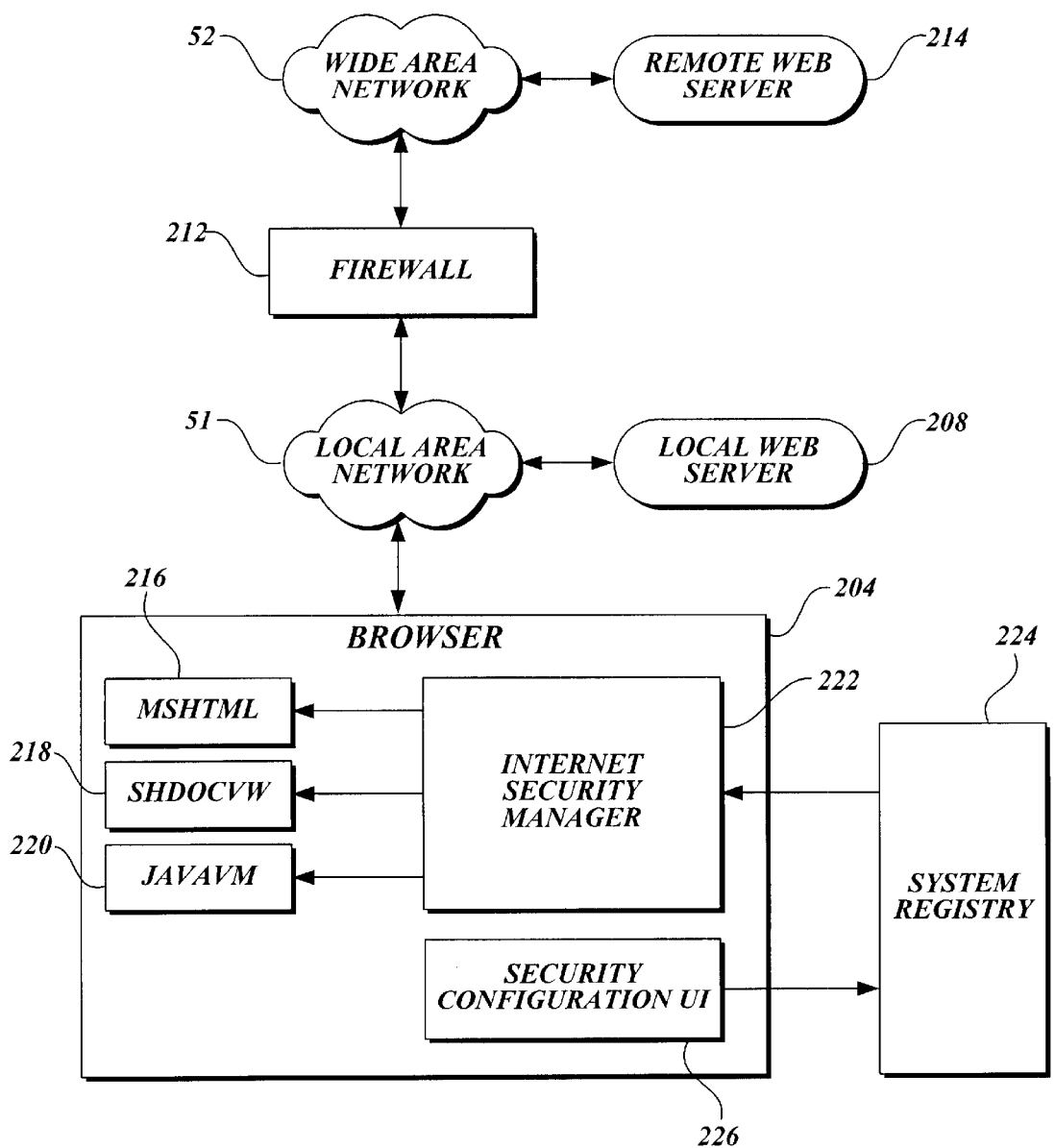
FIG. 2 is a block diagram illustrating an architecture of a Web browser, in accordance with the present invention.

FIG. 2 illustrates an architecture of a Web browser 204 communicating over a local area network 51 and a wide area network 52, such as the Internet. The local area network 51 functions as an intranet, connecting client computers executing Web browsers 204 to one or more local Web server computers 208. The local area network 51 communicates with the wide area network 52 through a firewall 212. The firewall 212 may comprise a computer that physically connects to the LAN 51 and the wide area network 52. Alternatively, the firewall 212 may comprise one or more computer programs executing on a computer connected to the LAN 51 and not intermediate to LAN 51 and the wide area network 52.

A remote Web server 214 communicates over the wide area network 52 to the Web browser 204. The remote Web server 214 may comprise one or more computer programs executing on the remote computer 49 illustrated in FIG. 1.

As should be understood by those skilled in the art of computer systems, and others, the architecture illustrated in FIG. 2 is exemplary, and alternative architectures may be used without departing from the spirit of the invention. For example, the firewall 212 is not required by the invention. Similarly, the invention does not require both the local area network 51 and the local Web server 208. As illustrated in FIG. 1, the client computer executing the Web browser 204 may communicate with the wide area network via a modem 54. Additionally, a Web server may comprise a server program that executes on the same client computer executing the Web browser 204. In such a configuration, communication between a client computer and a server computer refers to communication between programs or software components executing on the same computer.

As depicted in FIG. 2, the Web browser 204 includes three components that perform operations in response to receiving documents from a local Web server 208 or a remote Web server 214: an MSHTML component 216, an SHDOCVW component 218, and a JAVAVM component 220. The MSHTML component 216 performs operations that control the display of an HTML page. The MSHTML component, in cooperation with additional components (not shown), also controls scripting. The SHDOCVW component 218 performs operations related to the user interface. The JAVAVM component 220 performs operations related to Java applets. The MSHTML component 216, the SHDOCVW component 218, and the JAVAVM component 220 perform similarly with respect to the mechanism of the present invention. Each of these components communicates with an Internet security manager 222.

The Internet security manager 222 performs operations to determine the security zone corresponding to a Web server and to determine the permissible operations corresponding to a security zone. The Internet security manager passes security information to the MSHTML component 216, the SHDOCVW component 218, and the JAVAVM component 220, when requested. The Internet security manager 222 illustrated in FIG. 2 communicates with a system registry 224. The system registry 224 operates as a database of information pertaining to application programs that execute on the personal computer 20 (FIG. 1). Windows 95, available from Microsoft Corporation, of Redmond, Wash., provides a system registry that is employed by application programs to store configuration information for subsequent retrieval. A security configuration user interface component 226 within the browser 204 stores information pertaining to security in the system registry 224. In particular, the security configuration user interface component 226 stores information representing the security settings corresponding to each security zone and the distribution of Web sites among the security zones. As will be understood by those skilled in the art of computer programming and others, alternative mechanisms for storing and accessing the information may be used. For example, the information described as residing in the system registry 224 may alternatively reside in one or more data structures internal to the application or in files.

Figure 3:
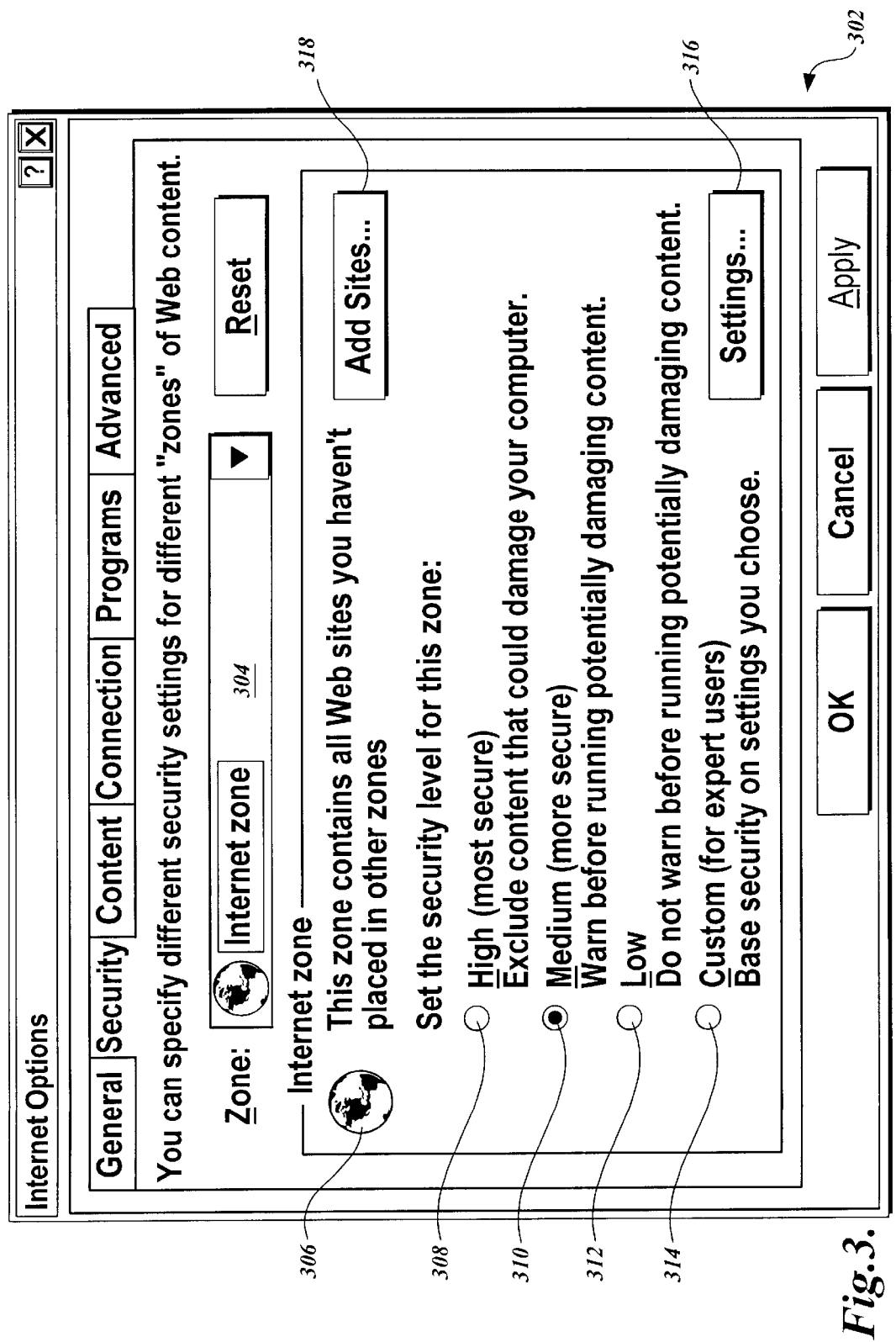
FIG. 3 is a pictorial representation of an "Internet Options" dialog window produced in accordance with the present invention.

FIG. 3 illustrates an "Internet Options" dialog window 302 that is presented by the security configuration user interface component 226 to configure security zones. As depicted in FIG. 3, a "zone" pull-down control 304 lists the different security zones. In one actual embodiment of the invention, four security zones are provided: a "local intranet" zone, a "trusted sites" zone, a "restricted sites" zone, and an "Internet" zone. The local intranet zone includes Web sites that reside on the local area network 51 (FIG. 2) and reside on the same side of the firewall 212 as the Web browser 204. The trusted sites zone includes Web sites that a user trusts. These are sites that a user believes do not contain files or documents that may include malicious code. Trusted sites may reside on the local area network 51 or the wide area network 52. The restricted sites zone includes sites that a user does not trust. In general, a user does not want to allow any operations to be performed in response to files or documents received from a restricted site that may allow malicious code to be executed. By default, the Internet zone includes all Web sites that are not in the local intranet zone or have not been assigned to either of the other zones. Although the actual embodiment of the invention specifies exactly four security zones, alternative embodiments could specify more zones, or less zones, or allow a user to create additional security zones.

The Internet Options dialog window 302 includes a zone description static text control 306 that provides a short description of the zone selected in the zone pull down control 304. Some of the security zones are configurable, and allow a user to specify the Web sites that are included within the zone. In the actual embodiment discussed above, the local Internet zone, the trusted sites zone, and the restricted sites zone are configurable in this manner. When one of these configurable zones is selected in the zone program control 304 an "add sites" push-button control 318 is enabled. When a user selects the add sites push-button control 318, the Web browser 204 presents a "Web sites" dialog window 602 illustrated in FIG. 6 and discussed in further detail below. The Web sites dialog window 602 provides a user with the ability to specify the Web sites corresponding to a security zone.

The Internet Options dialog window 302 also includes a mechanism for selecting a security level corresponding to each security zone. As depicted in FIG. 3, a choice of four security levels is provided: high level, medium level, low level, and custom level. Each security level has a corresponding radio button control. The high security level provides the most security, and excludes the greatest number of potentially damaging operations. The low security level provides the lowest level of security and allows the most operations to be performed without warning the user. The medium security level falls between the high level and the low level, and typically provides a warning to the user prior to performing potentially damaging operations. The custom security zone allows a user to customize the configuration for a security zone by specifying an action to be taken corresponding to each potential operation. The use of the custom security level is described in further detail below. The invention could include additional security levels or fewer security levels than the four levels depicted in FIG. 3.

For each of the security zones, a user can specify the corresponding security level. Each security zone has a default security level, which is used if not changed by a user. The default security level for the local intranet zone is medium. The default security level for the trusted sites zone is low. The default security level for the restricted sites zone is high, and the default security level for the Internet zone is medium. When a user selects a security zone in the zone pull-down control 304, the security configuration UI component 226 indicates the corresponding security level by selecting the corresponding security level radio button 308, 310, 312, or 314.

Figure 4:
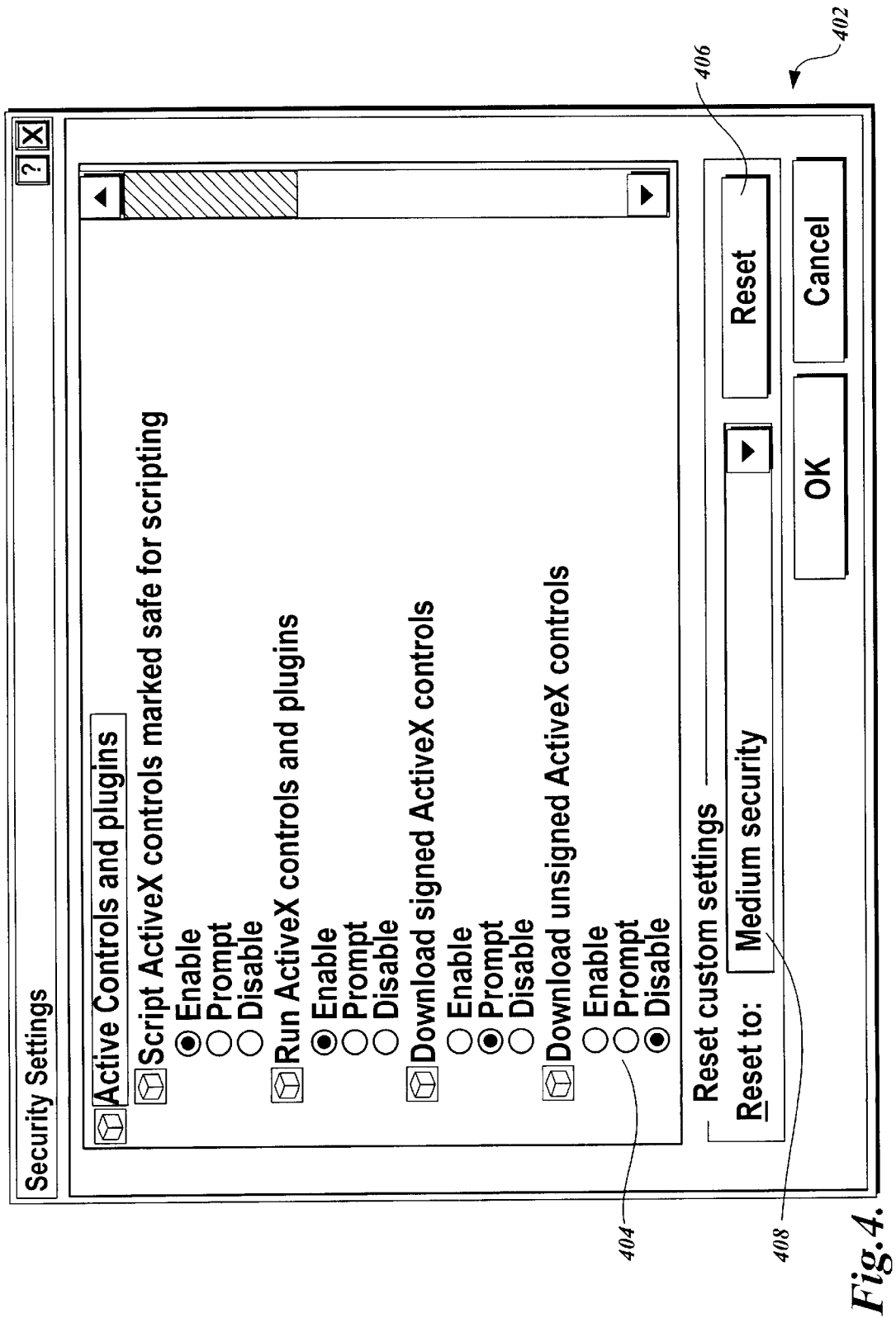
FIG. 4 is a pictorial representation of a "security settings" dialog window produced in accordance with the present invention.

When the custom security level radio button 314 is selected, a "settings" push-button 316 is enabled. "Pressing" the settings push-button 316 causes the Web browser 204 to display a "security settings" dialog window 402, illustrated in FIG. 4. The security settings dialog window 402 includes an operation settings control 404, which provides a list of protected operations that can be configured by the mechanism of the invention. For each protected operation, a set of two or more corresponding settings is displayed. A user can select a setting corresponding to each operation listed in the security settings dialog window 402.

In one actual embodiment of the invention, the security mechanism provides settings for each of the protected operations listed below. Under each protected operation, the choices for each setting are listed.

Script ActiveX Controls Marked "Safe for Scripting."
  Enable
  Prompt
  Disable
Run ActiveX Controls and Plug-Ins
  Enable
  Prompt
  Disable
Download Signed ActiveX Controls
  Enable
  Prompt
  Disable Download Unsigned ActiveX Controls
   Enable
   Prompt
   Disable
Initialize and Script ActiveX Controls Not Marked As "Safe."
   Enable
   Prompt
   Disable
Java Permissions
   Custom
   Low safety
   Medium safety
   High safety
   Disable Java
Active Scripting
   Enable
   Prompt
   Disable
Scripting of Java Applets
   Enable
   Prompt
   Disable
File Download
   Enable
   Disable
Font Download
   Enable
   Prompt
   Disable
Log-On
   Automatic log-on only in Internet zone
   Anonymous log-on
   Prompt for user name and password
   Automatic log-on with current user name and password
Submit Nonencrypted Form Data
   Enable
   Prompt
   Disable
Launching Applications and Files in an IFRAME
   Enable
   Prompt
   Disable
Installation of Desktop Items
   Enable
   Prompt
   Disable
Drag and Drop or Copy and Paste Files
   Enable
   Prompt
   Disable
Software Channel Permissions
   Low safety
   Medium safety
   High safety The set of protected operations can be extended within the present invention. For example, file access and network access by Java applets are protected by the Java permissions setting. The invention can be extended to protect these operations generally, when requested in any manner.

Figure 5:
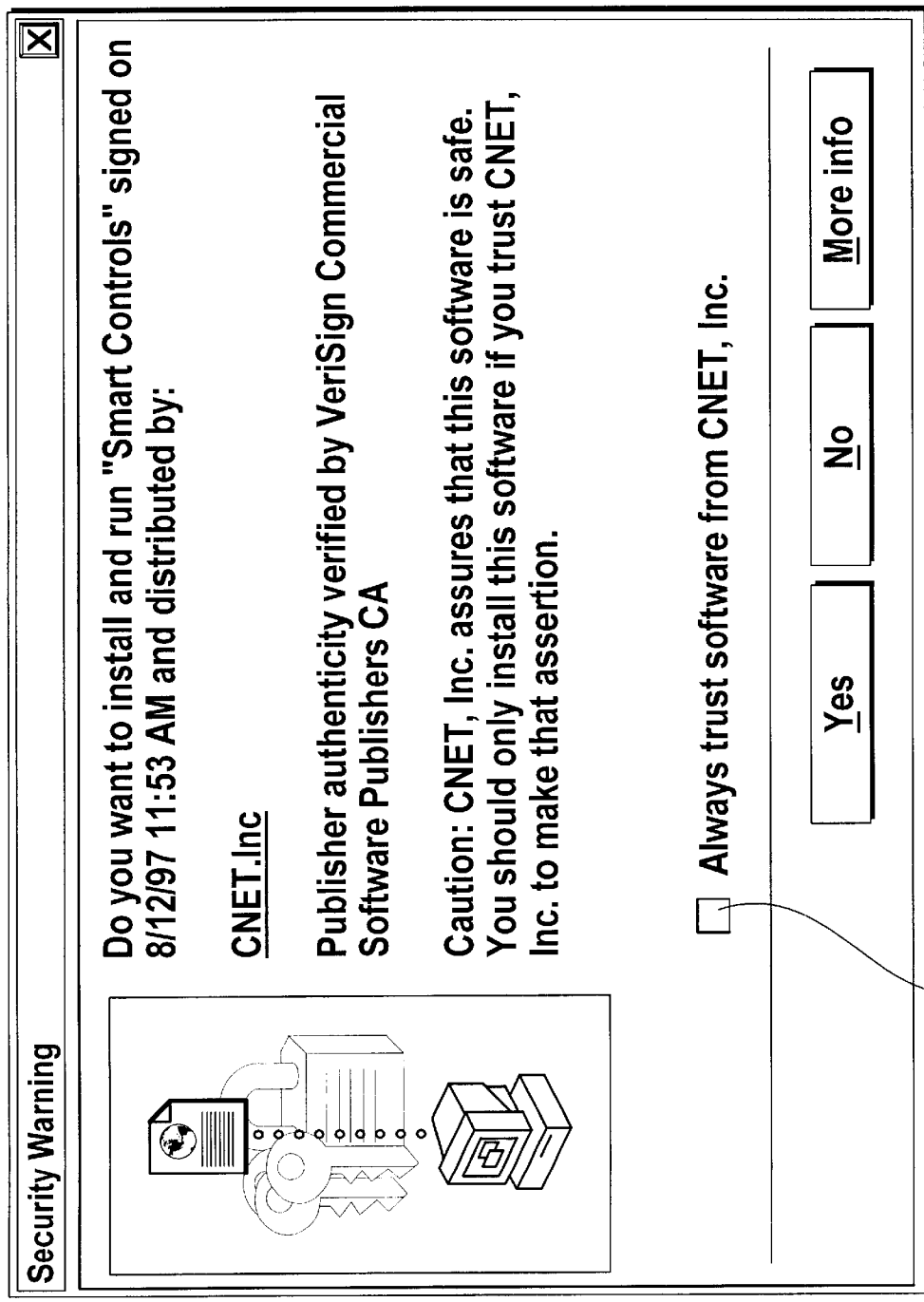
FIG. 5 is a pictorial representation of a "security warning" dialog window produced in accordance with the present invention.

A setting of "enable" corresponding to an operation indicates that the operation is to be performed, when requested, without warning the user. A setting of "disable" indicates that the corresponding operation is not to be performed. A setting of "prompt" indicates that, when the corresponding operation is requested, the Web browser should notify the user and query the user for whether to proceed with the operation. FIG. 5 illustrates an exemplary "security warning" dialog window 502 that is displayed in response to a request to perform an operation having a corresponding "prompt" setting. As illustrated in FIG. 5, the security warning dialog window 502 preferably informs the user of the operation to be performed and the current Web site that is requesting the operation. The user can answer yes or no to indicate whether the operation is to be performed.

As depicted in FIG. 5, in one actual embodiment, the security warning dialog window 502 includes an "always trust software" checkbox 504. When a user selects this checkbox, all software that is properly digitally signed from the specified source is considered to be "trusted software." Downloading trusted software is not considered to be a protected operation, as discussed herein.

The security settings dialog window 402 also includes a "reset" push-button 406 and a "reset to" pull-down control 408. When a user presses the reset button 406, all of the settings corresponding to the protected operations in the custom security level are reset to the security level specified in the "reset to" pull-down control 408. The user can then make changes to individual settings in the operation settings control list 404.

Figure 6:
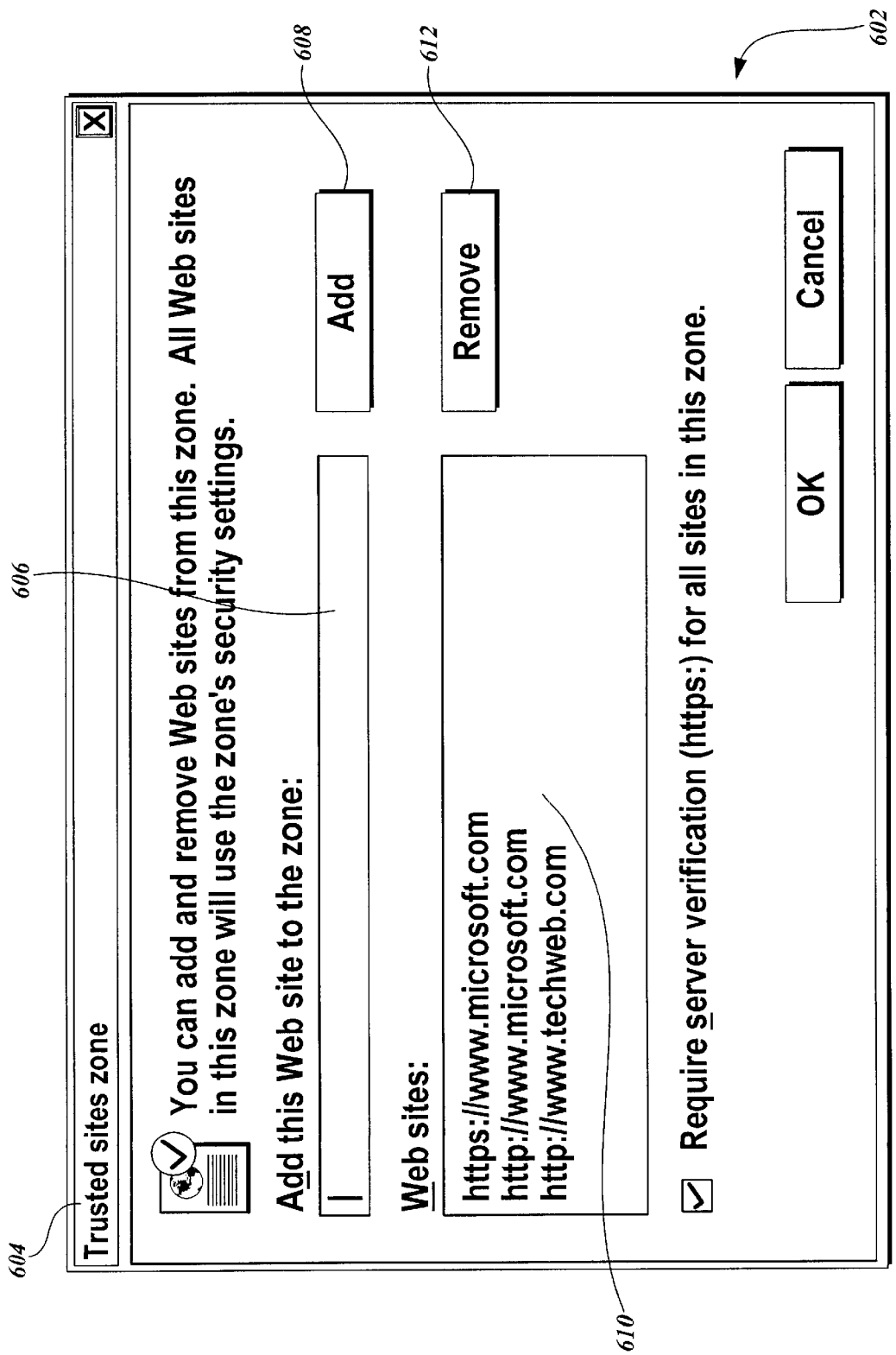
FIG. 6 is a pictorial representation of a "Web sites" dialog window produced in accordance with the present invention.

FIG. 6 illustrates a "Web sites" dialog window that allows a user to specify the Web sites corresponding to a security zone. The title 604 of the Web sites dialog window 602 indicates the currently selected security zone from the Internet Options dialog window 302. (FIG. 3) To add a Web site to the currently selected zone, a user enters the Web site address and a corresponding protocol in the "add" edit box 606 and then selects the "add" button 608.

A user may also specify a Web site using numeric IP addresses. Optionally, a user can specify a Web site address using an expression. For example, the expression "*.msn.com" specifies any top level domain ending in "msn.com." A user can also specify numeric range to include all Web sites having an IP address with the range.

The "Web sites" list box 610 displays a list of Web sites that are currently configured within the currently selected security zone. To remove a Web site from a security zone, a user selects a Web site within the Web site list box 610 and selects the "remove" button 612.

Figure 7:
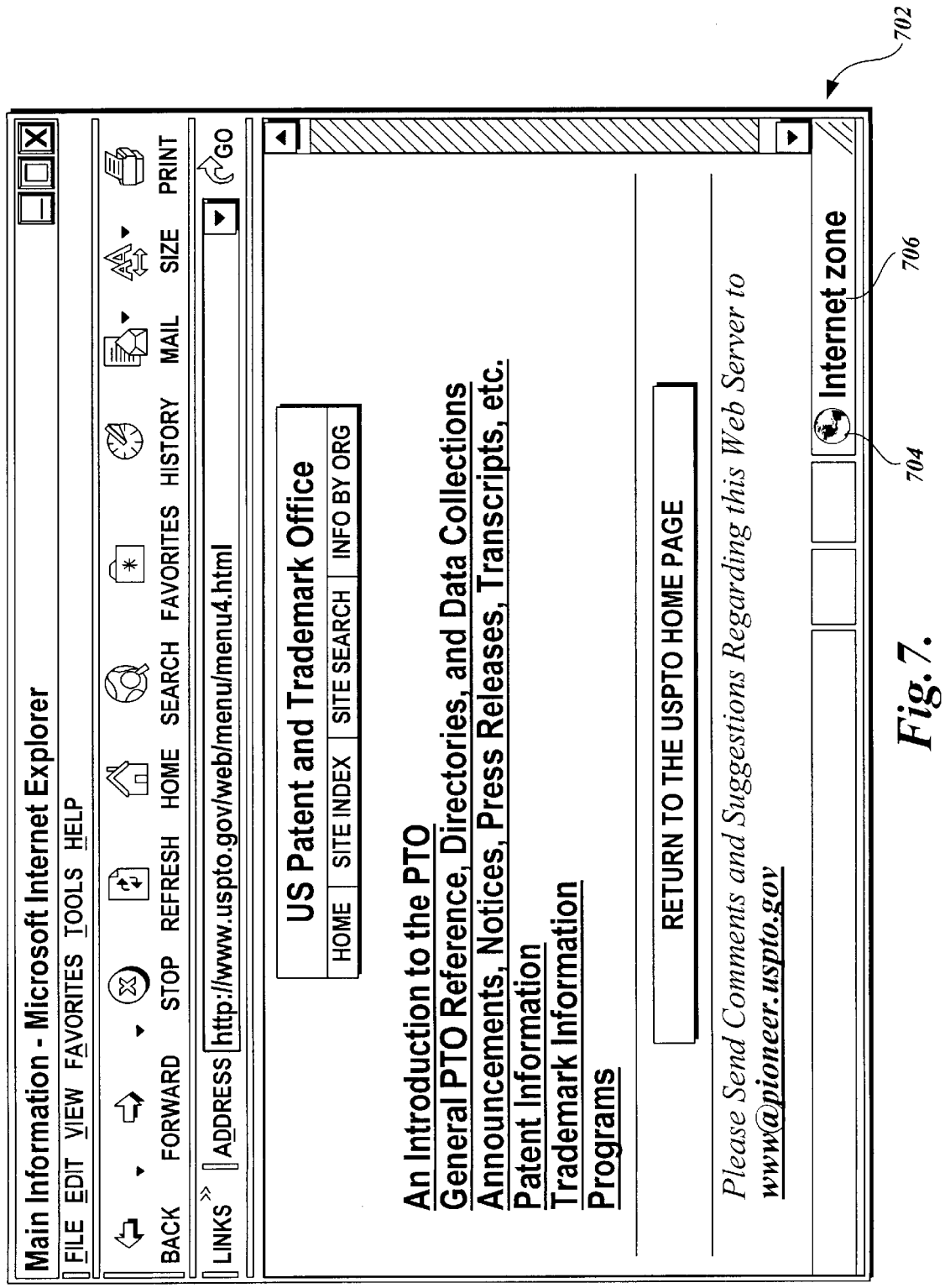
FIG. 7 is a pictorial representation of a Web browser window produced in accordance with the present invention.

FIG. 7 illustrates a Web browser window 702 produced in accordance with the present invention. When the Web browser 204 accesses a Web site, it displays an icon 704 and a text label 706 corresponding to the Web site's security zone, informing the user of the current security zone. The user can invoke the Internet Options dialog window 302 by double-clicking on the icon 704, and modify the security configuration as discussed above.

Figure 8:
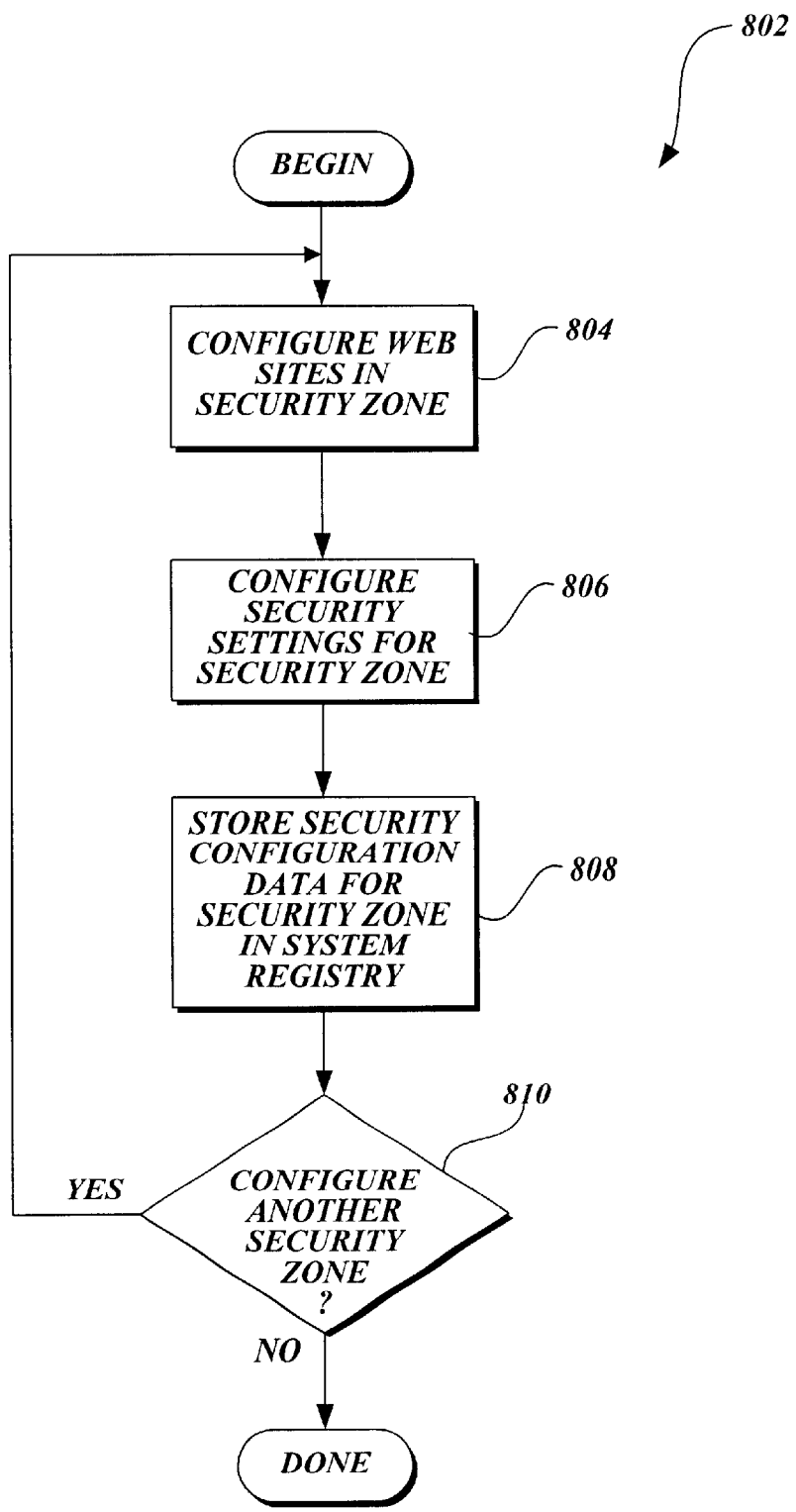
FIG. 8 is a flow diagram illustrating the process of specifying security settings in accordance with the present invention.

FIG. 8 illustrates a process 802 of configuring security information in the Web browser 204 (FIG. 2), as performed by the security configuration user interface component 226. At a step 804, the security configuration UI 226 configures the Web sites that are within a security zone. The step 804 includes displaying the Web sites dialog window 602 (FIG. 6) and receiving a selection of Web sites from the user.

At a step 806, the security configuration UI component 226 configures the security settings corresponding to the security zone. The step 806 includes displaying the Internet Options dialog window 302 (FIG. 3) and receiving a specification of the security level corresponding to the security zone. The step 806 may also include displaying the security settings dialog window 402 (FIG. 4) if a custom security level is selected, as discussed above.

Configuring the security settings includes receiving configuration information from a user. The user specifying the configuration information may operate the client computer executing the browser. Alternatively, the user may be an administrator operating a different computer on the same local area network as the client computer. The configuration information specified by an administrator may control the security for multiple client computers on a local area network.

At a step 808, the security configuration UI component 226 stores the security configuration data corresponding to the currently selected security zone in the system registry 224 (FIG. 2). At a step 810, a determination is made of whether another security zone is to be configured. If another security zone is to be configured, flow control loops back to the step 804. If another security zone is not to be configured, the process 802 of configuring security settings is complete.

Figure 9:
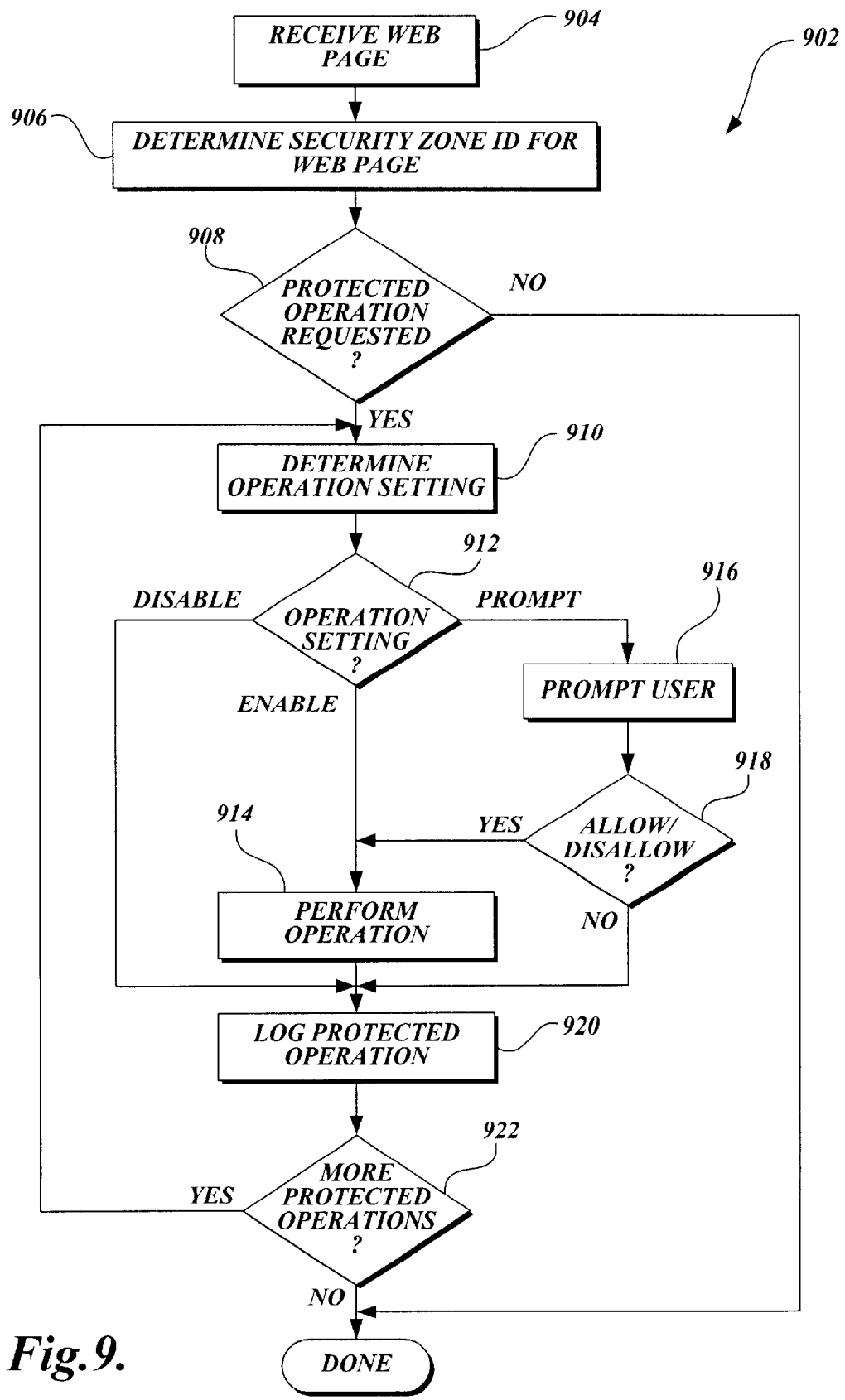
FIG. 9 is a flow diagram illustrating the process of perfonning operations associated with a Web page, in accordance with the present invention.

FIG. 9 illustrates a process 902 of receiving a Web page and performing requested operations, in accordance with the present invention. At a step 904, the Web browser 204 (FIG. 2) receives a Web page from a Web site at a Web server 208 or 214. At a step 906, the Web browser 204 determines the security zone corresponding to the Web site that transmitted the Web page. In one actual embodiment of the invention, the MSHTML component 216 invokes the Internet security manager 222, passing the address corresponding to the newly received Web page. The Internet security manager 222 uses the passed address to determine the corresponding top level domain and protocol. For example, the protocol may be HTTP, FTP, or FILE. The determination of the top level domain and the corresponding security zone identifier is discussed in further detail below. The Internet security manager 222 then returns the determined security zone ID to the MSHTML component 216.

At a step 908, during processing of the Web page, a determination is made of whether a protected operation is requested. If a protected operation is not requested, the process 902 is complete. If a protected operation is requested, at a step 910, the Web browser 204 determines the operation setting corresponding to the combination of the protected operation and the security zone ID. The step 910 of determining the operation setting includes either the MSHTML component 216, the SHDOCVW component 218, or the JAVAVM component 220 invoking the Internet security manager and passing the current security zone ID and the requested operation. The Internet security manager 222 then returns an operation setting, based on the security configuration. In one actual embodiment, the Internet security manager 222 maintains the present security configuration in the system registry 224 and examines this information to determine the operation setting corresponding to the current operation and zone ID.

At a step 912, the MSHTML component 216, the SHDOCVW component 218, or the JAVAVM component 220 that is controlling the protected operation makes a decision based on the operation setting determined at step 910. If the operation setting is "disable," the requested operation is not performed, and flow control proceeds to step 920, where information pertaining to the requested operation is logged. The mechanism of the invention can optionally display a dialog window to inform the user that a requested operation is denied. If the operation setting is "enable," the component performs the requested operation at a step 914. Flow control then proceeds to the step 920, where information pertaining to the requested operation is logged. If, at the step 912, the determined operation setting is "prompt," at a step 916, the browser 204 prompts the user as to whether to allow or disallow the requested operation. This prompt includes displaying the security warning dialog window 502 illustrated in FIG. 5.

At a step 918, a decision is made, based on the user's input, whether to allow or disallow the requested operation. If the user specifies that the operation is to be disallowed, flow control proceeds to the step 920, where information pertaining to the requested operation is logged. If the user specifies that the operation is to be allowed, flow proceeds to the step 914, where the operation is performed. Flow then proceeds to the step 920. The step 920 is an optional step of storing, in a log, a record of the requested protected operation and the action taken in response.

At the step 922, the browser 204 determines whether there are any additional protected operations to be performed. If there are additional protected operations, flow control loops back to the step 910. If, at the step 922, there are no more protected operations corresponding to the current Web page, the process 902 is complete for the current Web page.

As discussed above, at the step 906, the Internet security manager 222 determines the security zone ID based on the address of the current Web page. This step includes parsing the Web page address to determine the top level domain and protocol. For example, if the Web page address is:

http://www.microsoft.com/ie/plus/default.htm the corresponding top level domain is:

www.microsoft.com and the protocol is HTTP. If the Web page address is:

ftp://www.microsoft.com/samples/demo.zip the corresponding top level domain is:

www.microsoft.com and the corresponding protocol is FTP. The protocol corresponding to an address can also be "FILE" if the corresponding address is in a local file system. For example, if the address is:

c:\documents\doc1.htm the corresponding top level domain is "c:\" and the corresponding protocol is FILE, indicating a file system protocol.

If the system is configured using one or more expressions to indicate domain names, preferably explicit specifications take precedence over general specifications. For example, if a system is configured with "investor.msn.com" in one zone, and "*.msn.com" in a second zone, a match with "investor.msn.com" overrides the second specification.

After determining the top level domain and protocol of the current Web page, the Internet security manager 222 then examines the security configuration information to determine which of the security zones includes the combination of top level domain and protocol. As discussed above, the configuration information is preferably stored in the system registry 224.

A user may configure the Web browser 204 so that two different protocols corresponding to the same top level domain reside in two different security zones. For example, referring to the addresses illustrated above, the combination of HTTP and www.microsoft.com may be configured in the trusted sites security zone, while the combination of FTP and www.microsoft.com may be configured within the Internet security zone.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer based method for providing client based security during a network browsing session between a client computer and a server computer, the method comprising:

receiving, at the client computer, a Web document from the server computer for execution on the client computer that contains code in the actual content of the Web document that requests the client computer to perform an operation pertaining to the Web document;

in response to the client computer receiving a Web document from the server computer for execution on the client computer that contains code in the actual content of the Web document that requests the client computer to perform an operation pertaining to the Web document, the client computer analyzing the code to determine whether the requested operation is a protected operation prior to executing the Web document;

if a protected operation is to be performed, the client computer determining a security setting corresponding to the protected operation; and the client computer executing the Web document if performing the protected operation is allowed based on the security setting.

2. The method of claim 1, further comprising the client computer selectively preventing execution of the Web document if performance of the protected operation is not allowed based on the security setting.

3. The method of claim 1, wherein the request to perform the protected operation is received by a user of the client computer.

4. The method of claim 1, wherein the request to perform the operation is received from the Web document.

5. The method of claim 1, further comprising:
the client computer selectively querying a user whether to perform the protected operation based on the security setting prior to executing the Web document; and the client computer selectively executing the Web document and performing the protected operation based on a response received from the user.

6. The method of claim 1, further comprising storing in a log data indicating the protected operation.

7. The method of claim 1, wherein the client computer includes a browser executing thereon, the method further comprising:
configuring the browser to include a specification of a plurality of zones, each zone including at least one Web site and having a corresponding set of at least one security setting;

determining a zone corresponding to the Web site; and wherein said determining a security setting is based on the protected operation and the zone corresponding to the Web site.

8. The method of claim 7, wherein configuring the browser comprises receiving configuration information from a user at the client computer.

9. The method of claim 7, wherein configuring the browser comprises receiving configuration information from a user at an administrator computer distinct from the client computer.

10. The method of claim 7, wherein the client computer is located behind a firewall, further comprising:
receiving at least one Web document from each of a plurality of Web sites, each Web site corresponding to a server computer, said plurality of Web sites including a Web site corresponding to a local server computer behind the firewall and a Web site corresponding to a remote server computer external to the firewall;

wherein at least one zone excludes all Web sites corresponding to server computers external to the firewall; and wherein at least one zone excludes all Web sites corresponding to server computers behind the firewall.

11. The method of claim 7, further comprising:
displaying the Web document from the Web site; and displaying information indicating the zone corresponding to the Web site at least partially concurrently with displaying the Web document.

12. The method of claim 1, wherein the protected operation comprises receiving a file from the server computer.

13. The method of claim 1, wherein the protected operation comprises receiving a software component from the server computer.

14. A computer-readable medium having computer-executable instructions for performing the method recited in claim 1.

15. The method of claim 1, further comprising:
the client computer receiving, from a user, a specification of a security zone, the specification indicating at least one server computer to be included in the security zone;

the client computer receiving, from the user, a specification of a security level to be associated with the security zone; and the client computer storing the specification of the security zone and the specification of the associated security level prior to receiving the Web document from the server computer to be included in the security zone.

16. The method of claim 15, wherein the user operates the client computer.

17. The method of claim 15, wherein the user operates an administrator computer that communicates with the client computer.

18. A computer-readable medium having computer-executable instructions for performing the method recited in claim 15.

19. The method of claim 1, further comprising:
the client computer receiving, from a user, a specification of a plurality of security zones, each security zone specification indicating at least one Web site to be included in the corresponding security zone;

the client computer receiving from a user, for each security zone, a specification of a corresponding security level to be associated with the security zone;

receiving, at the client computer, a Web document from a Web site included in one of the security zones; and the client computer storing the specification of the security zones and the specification of the associated security levels at the client computer prior to receiving the Web document from the Web site included in said one of the security zones.

* * * * *

UNITED STATES PATENT AND TRADEMARK OFFICE
CERTIFICATE OF CORRECTION

PATENT NO. : 6,366,912 B1  Page 1 of 1
DATED : April 2, 2002
INVENTOR(S) : M.J. Wallent et al.

It is certified that error appears in the above-identified patent and that said Letters Patent is hereby corrected as shown below:

Column 2,
Line 59, "operation to be" should read -- operation is to be --

Column 4,
Line 13, "perfonning" should read -- performing --

Column 5,
Line 18, "helps" should read -- help --
Line 20, "farther" should read -- further --
Line 24, "CD ROM" should read -- CD-ROM --
Line 41, "(ROM)," should read -- (ROMs), --

Column 6,
Line 6, "(WAN) 52, Such" should read -- (WAN) 52. Such --

Column 8,
Line 2, "control 304 an" should read -- control 304, an --

Column 10,
Line 58, "Web sites dialog" should read -- Web sites' dialog --

Column 14,
Line 49, "receiving from" should read -- receiving, from --

Signed and Sealed this

Tenth Day of December, 2002

JAMES E. ROGAN
*Director of the United States Patent and Trademark Office*